May 8, 1923.
F. J. KURTZ
1,454,321
TOP FRAME AND DECK FOR AUTOMOBILES
Filed March 27, 1922
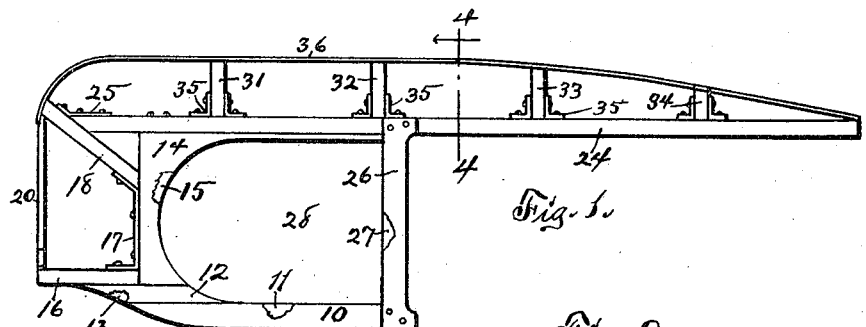
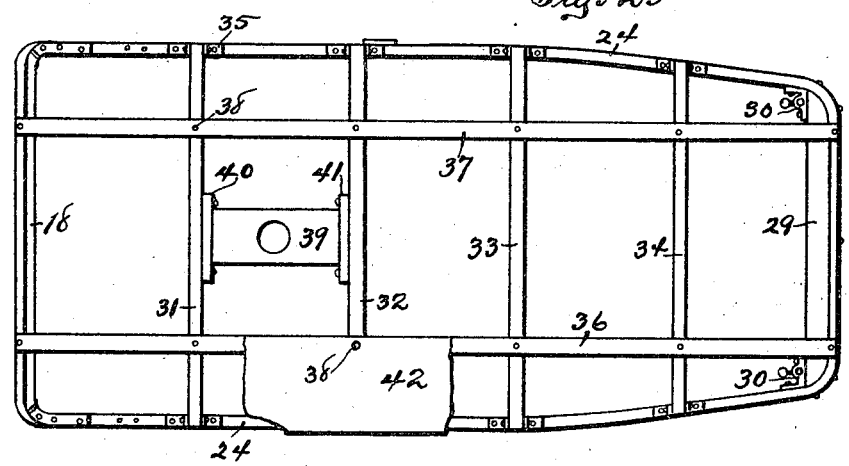
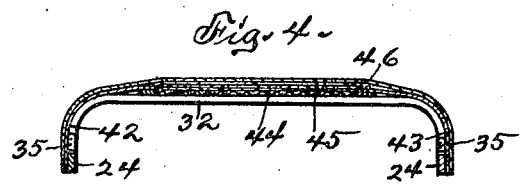
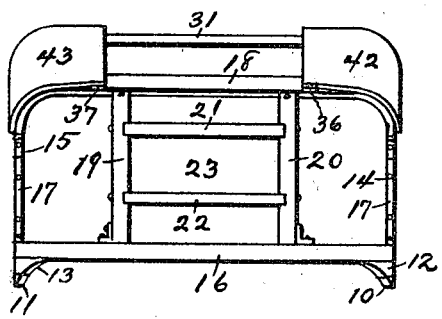
Inventor:
Frank J. Kurtz.
By Silas C. Swect,
Atty Patented May 8, 1923.

1,454,321

UNITED STATES PATENT OFFICE.

FRANK J. KURTZ, OF MARSHALLTOWN, IOWA.

TOP FRAME AND DECK FOR AUTOMOBILES.

Application filed March 27, 1922. Serial No. 547,126.

*To all whom it may concern:*

Be it known that I, FRANK J. KURTZ, a citizen of the United States of America, and resident of Marshalltown, Marshall County, Iowa, have invented a new and useful Top Frame and Deck for Automobiles, of which the following is a specification.

The object of this invention is to provide an improved construction for the frame of a top for automobiles.

A further object of this invention is to provide improved means for constructing the quarters of an automobile top.

A further object of this invention is to provide improved means for constructing and cushioning the deck of an automobile top.

A further object of this invention is to provide improved means for constructing the back or rear end portion of an automobile top.

A further object of this invention is to provide improved means for combining stays and bows in an automobile top whereby the top is rendered elastic independently of the deck and yieldable to twisting movements of the frame of a car on which it is used.

A further object of this invention is to provide improved means for framing glass panels and at the same time retaining sufficient strength in the central portion of an automobile top.

My invention consists in the construction, arrangement and combination of elements hereinafter set forth, pointed out in my claims and illustrated by the accompanying drawing, in which—

Figure 1 is a side elevation of my improved top frame in skeleton form. Figure 2 is a plan of the elements shown in Figure 1, a portion of a quartering member being applied thereto. Figure 3 is a rear end elevation of the elements shown in Figure 1, quartering elements being applied thereto at the sides thereof. Figure 4 is a cross-section on the indicated line 4—4 of Figure 1, showing the deck construction superposed on the frame and quartering members.

In the construction of the device as shown the numerals 10, 11 designate sills which are alike in construction and adapted to be superposed on and fixed to the sides of the tonneau of a touring car, not shown. On account of varying shapes and finishes given to the sides of different touring cars, the sills 10, 11 may vary as to the shape of the lower margins thereof in order that they may properly fit on and be supported by said sides. Extension members 12, 13 are mounted on, fixed to and extend rearwardly from the rear end portions of the sills 10, 11. Side members 14, 15 are mounted on, fixed to and rise from and in the same planes with the extension members 12, 13 and the upper portions of said side members extend forwardly parallel with and above the sills 10, 11. The forward margins of the side members 14, 15 preferably are curved substantially to the extent of a half circle and the rear margins of said side members preferably are perpendicular to the upper faces of the extension members 12, 13. A bow 16 has its ends overlying the rear end portions of the extension members 12, 13 and abutting the rear margins of the lower portions of the side members 14, 15 and said end portions of the bow preferably are secured to the side members 14, 15 by angle irons 17. The bow 16 occupies a recumbent position and its closed portion or central bar forms the rear end of the bottom part of the top frame. A bow 18 is arranged in an inclined position above the bow 16 and has its ends beveled and abutting the rear margins of the side members 14, 15 at points below the upper ends of said side members and said end portions of the bow preferably are secured to said side members by upper portions of the angle irons 17. The closed portion or central bar of the bow 18 preferably lies in the vertical plane of the corresponding part of the bow 16 and is spaced therefrom substantially the height of the rear portion of the back of the top frame. The closed portions or central bars of the bows 16, 18 are connected by struts 19, 20, which are rigidly secured thereto and the struts 19, 20 are connected between the bows by ribs 21, 22, thus forming a rectangular space or panel 23 adapted to receive a window, not shown. A hood bow 24, of materially greater length than width, is superposed on the side members 14, 15, has its rear ends beveled and abutting the inclined upper margins of the end portions of the bow 18 and secured thereto, preferably by angle irons 25. The arms of the bow 24 also are secured to the side members 14, 15 as by the use of screws or nails extending through either member into the other and the central portions of the arms of said bow are further secured to the sills 10, 11 by standards 26, 27. The standards 26, 27 are perpendicular to and located at the forward ends of the sills 10, 11 and they intersect the forward ends of the side members 14, 15 and, together therewith, enclose spaces 28 square at one end and rounded at the other, which spaces are adapted to receive windows, not shown. In my companion application pending concurrently herewith, windows are shown in the spaces or panels 23 and 28 and the construction thereof is illustrated and described therein. The closed portion or central bar of the hood bow 24 extends across and forms the front of the top frame and a plate 29 is mounted in the central portion of the bow and fixed to said central bar, which plate is adapted to intersect the vertical plane of the windshield of an automobile on which this top is used and be secured thereto by clips 30 of any suitable form, which clips are now common and well known. Transverse upwardly arched bows 31, 32, 33, 34, in any desired number, are arranged in spaced relation throughout the length of the median line of the hood bow and end portions of the transverse bows abut the upper margins of the arms of the hood bow and are secured thereto preferably by angle irons 35. The transverse bows may vary as to length of arms in order that when placed in position as shown the central portions of the bows may vary in altitude relative to the hood bow. This variation in altitude is a matter of design and may be employed selectively. Longitudinal strips 36, 37 are mounted in parallel and spaced relation transversely of the bows 18, 31, 32, 33, 34 and 24 and are secured thereto preferably by spring bolts 38 arranged at each intersection. The portions of the transverse bows 31, 32, 33, 34 lying between the respective strips 36, 37 and the arms of the bow 24 preferably describe substantially quarter circles, thus spacing the strips from the arms of the bow 24 substantially half the distance that the strips are spaced apart. The rear end portions of the strips 36, 37 preferably are curved downward toward their points of attachment to the central bar of the bow 18 and those portions of the strips forwardly of the center thereof preferably are inclined or carried on gradual curves to their points of attachment to the central bar of the hood bow 24, said inclined or gradual curve being made possible by the variation in altitude of the transverse bows. A lamp plate 39 is located between the central portions of the bows 31, 32 and is secured at its ends to cleats 40, 41, said cleats being secured at their ends to said bows.

Concaved quartering members 42, 43, preferably made of sheet metal and suitably shaped, are mounted on opposite sides of the frame structure and are secured respectively to the arms of the hood bow and the strips 36, 37. The connection between the quartering members 42, 43 and the strips 36, 37 may be by means of the bolts 38, thus providing some degree of flexibility between the bows, strips and quartering members, whereby the top frame may yield to twisting strains communicated from the frame of the automobile on which it is used and at the same time maintain a stable and supporting relation to prevent dislocation or disarrangement of the connected parts.

The strips 36, 37 and central portions of the bars 18, 31, 32, 33, 34 and 24 preferably are overlaid by and support a sheet 44 of canvas and a number of superposed sheets 45 of wadding or packing material are laid on and supported by the sheet of canvas and may overlap in part the inner margins of the quartering members 42, 43. A deck 46 or top covering, usually made of leather, imitation leather or waterproof material, is laid on and covers the quartering members, strips, bows and wadding and is finished at its connection with the bows 24 and 18 in a suitable manner. A back curtain not shown forms a continuation of the rear portion of the deck or top covering 46 and overlies the rear part of the frame. The finishing elements of the deck or cover 46 and the back curtain are shown and described in my companion application above noted.

The top frame and deck as above described may be removed and replaced relative to the body or tonneau of a touring car and may to some extent be used interchangeably on different touring cars comprised within a given class or model; and exhibits elements of efficiency noted in increased vision, stability, flexibility and lightness as compared with similar devices now in use.

I claim as my invention—

1. A top frame for automobiles, comprising side sills, side members rising therefrom, a lower bow connecting said sills and side members in recumbent position, an inclined bow connecting said side members above the lower bow, a hood bow overlying the side members and projecting forwardly therefrom, said hood bow being connected to the side members and inclined bow, standards connecting the sills to intermediate portions of the hood bow, transverse bows carried by the hood bow, and a deck superposed on the inclined bow, hood bow and transverse bows.

2. A top frame for automobiles, comprising side sills, side members rising therefrom, a lower bow connecting said sills and side members in recumbent position, an inclined bow connecting said side members above the lower bow, a hood bow overlying the side members and projecting forwardly therefrom, said hood bow being connected to the side members and inclined bow, standards connecting the sills to intermediate portions of the hood bow coincident with the forward ends of the side members, transverse bows carried by the hood bow, and a deck superposed on the inclined bow, hood bow and transverse bows.

3. A top frame for automobiles, comprising side sills, side members rising therefrom, a lower bow connecting said sills and side members in recumbent position, an inclined bow connecting said side members above the lower bow, paneling members connecting the recumbent and inclined bows, a hood bow overlying the side members and projecting forwardly therefrom, said hood bow being connected to the side members and inclined bow, standards connecting the sills to intermediate portions of the hood bow, transverse bows carried by the hood bow, and a deck superposed on the inclined bow, hood bow and transverse bows.

4. A top frame for automobiles, comprising side sills, side members rising therefrom, a lower bow connecting said sills and side members in recumbent position, an inclined bow connecting said side members above the lower bow, a hood bow overlying the side members and projecting forwardly therefrom, said hood bow being connected to the side members and inclined bow, standards connecting the sills to intermediate portions of the hood bow, transverse bows carried by the hood bow, longitudinal strips carried by the inclined, hood and transverse bows, quartering members carried by the upper bows and strips, and a deck superposed on the inclined bow, hood bow and transverse bows.

5. A top frame for automobiles, comprising side sills, side members rising therefrom, a lower bow connecting said sills and side members in recumbent position, an inclined bow connecting said side members above the lower bow, a hood bow overlying the side members and projecting forwardly therefrom, said hood bow being connected to the side members and inclined bow, standards connecting the sills to intermediate portions of the hood bow, transverse bows carried by the hood bow, longitudinal strips carried by the inclined, hood and transverse bows, quartering members carried by the upper bows and strips, a flexible plate overlying the central portions of the inclined, hood and transverse bows between said strips, wadding superposed on said flexible plate, and a deck superposed on the inclined bow, hood bow and transverse bows.

6. A top frame for automobiles, comprising side sills, side members rising therefrom, a lower bow connecting said sills and side members in recumbent position, an inclined bow connecting said side members above the lower bow, a hood bow overlying the side members and projecting forwardly therefrom, said hood bow being connected to the side members and inclined bow, standards connecting the sills to intermediate portions of the hood bow, transverse bows carried by the hood bow, longitudinal strips carried by the inclined, hood and transverse bows, sheet metal quartering members carried by the upper bows and strips, and a deck superposed on the inclined bow, hood bow and transverse bows.

Signed at Des Moines, in the county of Polk and State of Iowa, this 28th day of January, 1922.

FRANK J. KURTZ.